US009992552B2

United States Patent
MacKenzie et al.

(10) Patent No.: US 9,992,552 B2
(45) Date of Patent: Jun. 5, 2018

(54) DATA COMMUNICATIONS

(71) Applicant: BRITISH TELECOMMUNCATIONS PUBLIC LIMITED COMPANY, London (GB)

(72) Inventors: Richard Thomas MacKenzie, London (GB); Andrew James Garrett, London (GB); Colin John Harrold, London (GB); Michael Robert Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days. days.

(21) Appl. No.: 14/775,120

(22) PCT Filed: Mar. 12, 2014

(86) PCT No.: PCT/GB2014/000093
§ 371 (c)(1),
(2) Date: Sep. 11, 2015

(87) PCT Pub. No.: WO2014/140514
PCT Pub. Date: Sep. 18, 2014

(65) Prior Publication Data
US 2016/0037231 A1  Feb. 4, 2016

(30) Foreign Application Priority Data
Mar. 13, 2013 (EP) ................................. 13250027

(51) Int. Cl.
*H04N 21/65* (2011.01)
*H04N 21/235* (2011.01)
(Continued)

(52) U.S. Cl.
CPC .......... *H04N 21/65* (2013.01); *H04N 21/235* (2013.01); *H04N 21/2385* (2013.01);
(Continued)

(58) Field of Classification Search
CPC .................... H04N 21/2225; H04N 21/23106
See application file for complete search history.

(56) References Cited

U.S. PATENT DOCUMENTS 6,052,715 A    4/2000 Fukui
6,314,082 B1   11/2001 Malmgren
(Continued)

FOREIGN PATENT DOCUMENTS

EP  1248412 A2  10/2002

OTHER PUBLICATIONS

International Search Report, Application No. PCT/GB2014/000093, dated Apr. 4, 2014, 3 pages.

*Primary Examiner* — Olugbenga O Idowu
(74) *Attorney, Agent, or Firm* — Amy M. Salmela; Patterson Thuente Pedersen, P.A.

(57) ABSTRACT

Embodiments herein provide systems and methods for sending broadband data to end-users over a DTTV broadcast transmission. Systems and methods for receiving such data are also described. A wireless overlay system is set up by an Internet Service Provider/Communications Provider (ISP/CP) 11 by means of receiving from end-user equipment 27 data requests over a DSL uplink together with identification of at least one DTTV transmitter 21 23. The ISP/CP 11 provides an overlay controller 26 which causes routing of the requested data over a selected DTTV transmitter 21. At the end-user equipment, the requested data can be received from the DTTV broadcast and extracted for output.

15 Claims, 6 Drawing Sheets

(51) Int. Cl.
    *H04N 21/2385* (2011.01)
    *H04N 21/4722* (2011.01)
    *H04N 21/61* (2011.01)
    *H04N 21/658* (2011.01)
    *H04N 21/426* (2011.01)
    *H04N 21/6547* (2011.01)

(52) U.S. Cl.
    CPC ... *H04N 21/42684* (2013.01); *H04N 21/4722* (2013.01); *H04N 21/6112* (2013.01); *H04N 21/6175* (2013.01); *H04N 21/6581* (2013.01); *H04N 21/6547* (2013.01)

(56) References Cited

U.S. PATENT DOCUMENTS

| | | | |
|---|---|---|---|
| 2002/0028680 A1 | 3/2002 | Jenkins | |
| 2005/0015811 A1 | 1/2005 | Norman | |
| 2007/0183441 A1* | 8/2007 | Medin | H04L 12/1845 370/429 |
| 2010/0132000 A1* | 5/2010 | Straub | H04N 5/50 725/117 |
| 2012/0082100 A1* | 4/2012 | Ahmadi | H04W 72/1215 370/329 |
| 2013/0176878 A1* | 7/2013 | Lee | H04B 7/0805 370/252 |

* cited by examiner

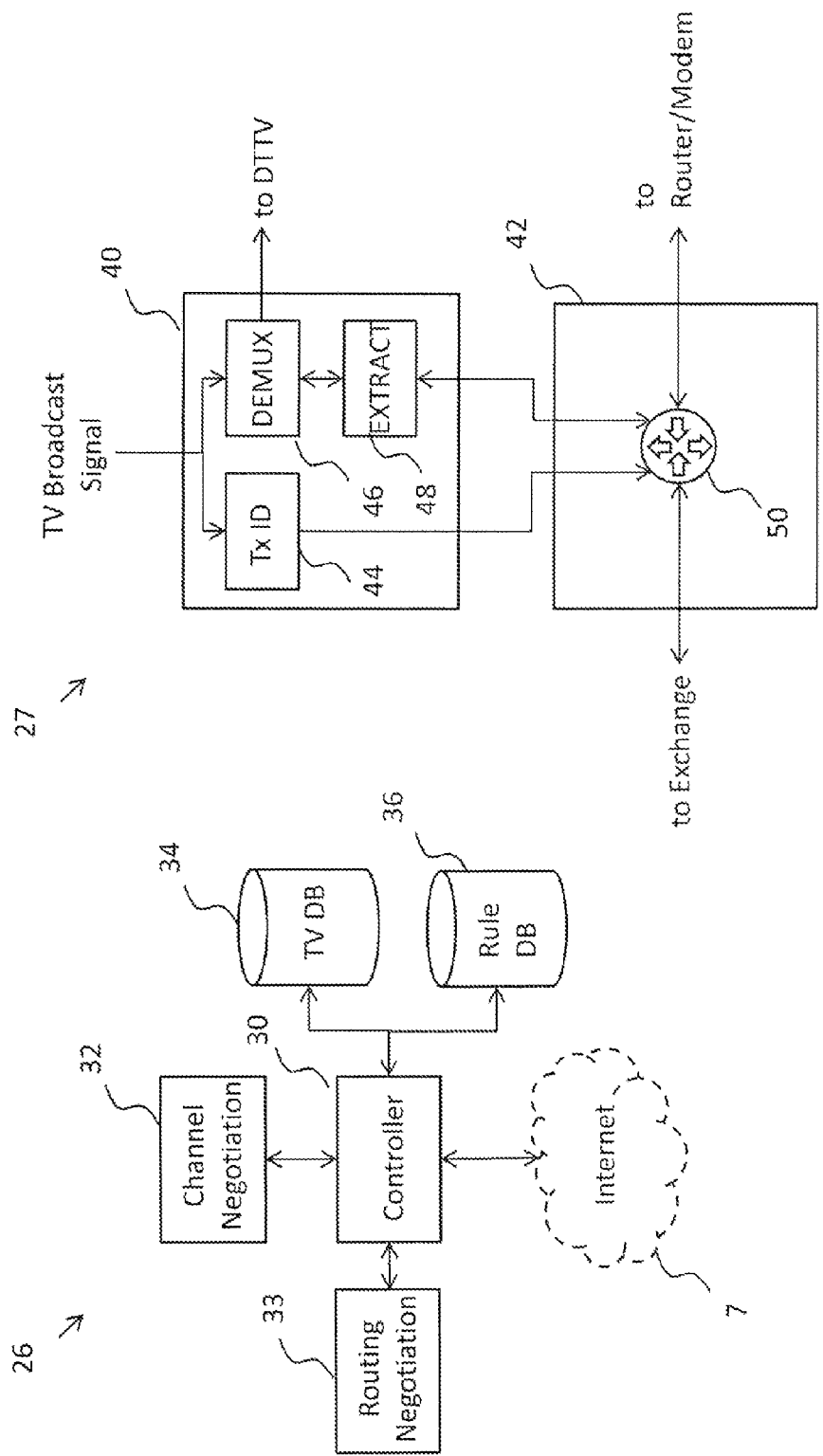

DATA COMMUNICATIONS

RELATED APPLICATIONS

The present application is a National Phase entry of PCT Application No. PCT/GB2014/000093, filed Mar. 12, 2014, which claims the benefit of EP Application No. 13250027.3 filed Mar. 13, 2013, each of which is incorporated herein by reference in its entirety.

TECHNICAL FIELD

Embodiments relate to data communications, particularly a method and system providing a data communications downlink using a digital terrestrial television (DTTV) broadcast signal.

BACKGROUND

Service providers typically receive and transmit broadband data over a fixed connection to end-user equipment. The speed or amount of data that a user receives will be limited due to various factors such as the capacity of the connection, the contention ratio, or simply because the user subscribes to a low speed service.

Certain satellite television providers also deliver broadband data by satellite transmission. A wired DSL connection provides the uplink in the conventional way but the entire downlink is by means of a satellite transmission. Only one satellite is employed for the downlink and the capacity is limited thereby restricting download speeds. Also, if the satellite fails, there is no downlink.

With video streaming and online gaming becoming increasingly popular, there exist disadvantages with such speed-limited services.

In many countries, digital terrestrial television (DTTV) is the norm or is becoming the norm for delivering terrestrial television services. Users typically have a DTTV set-top box connected to their television set. Users are often in-range of multiple DTTV transmitters each of which transmits television channels on encoded broadcast streams, or multiplexes.

The term broadband data in the context of this disclosure is intended to mean packetized data, typically encoded using the Internet Protocol (IP) or variants thereof. Fixed connections mean any connection between the user's premises and the Internet access point that is wired or cabled (generally termed "fixed-line" connections) and, also, fixed wireless connections which provide point-to-point (non-broadcast) connections. The term therefore covers Digital Subscriber Line (DSL) and optical fibre connections. "xDSL" is sometimes used to refer to any of an increasing family of DSL technologies, but the term "DSL" will in general be used here.

SUMMARY

A first aspect provides a method of providing broadband data to end-user devices, the method comprising: receiving from an user device over a fixed connection a signal including data requests and information identifying, or from which can be identified, a digital terrestrial television (DTTV) transmitter detected by the end-user device; requesting and receiving the data identified in the data requests from an external data communications network; and causing transfer of part or all of the received data to the detected DTTV transmitter with an identifier associated with the end-user device for onwards transmission in a DTTV broadcast signal.

A wireless overlay system can therefore be provided by which a fixed connection, or primary channel, is used for the uplink and for some or none of the downlink in certain situations, with the DTTV downlink being used in preference, or as an additional/alternative downlink. This offers numerous technical advantages, including increased capacity and download speeds given the additional bandwidth offered by the DTTV spectrum.

In one embodiment, the fixed connection is a fixed-line connection, encompassing any connection provided over a telephone wire or optical fiber. As already mentioned, the fixed connection can also be a fixed wireless connection providing point-to-point non-broadcast communications.

The signal from the user device can identify a plurality of DTTV transmitters detected by the end-user device and wherein the method further comprises selecting one of said DTTV transmitters to which to transfer the received data to. The DTTV transmitter selection may be performed in accordance with one or more transmitter selection rules each of which defines an event/condition and a corresponding operation to be performed in response to detection of the event/condition. For example, the method may further comprise receiving signal strength information corresponding to each DTTV transmitter from the user device over the fixed connection and wherein the transmitter selection rules define that the DTTV transmitter offering the greatest signal strength is selected. The method may additionally or alternatively comprise accessing a database storing for each DTTV transmitter the data usage on each transmitter and wherein the transmitter selection rules define which DTTV transmitter is selected based on data usage criteria. The rules may define that if the DTTV transmitter offering the greatest signal strength exceeds a threshold of data usage then a different DTTV transmitter is selected. The rules may further define that the DTTV transmitter offering the next-greatest signal strength and which is below the threshold of data usage is selected. The rules may further define that the DTTV transmitter offering the least data usage is selected.

The method may further comprise accessing a database storing for each DTTV transmitter channel or multiplex usage information and selecting from the available channels or multiplexes of the DTTV transmitter that which will be used to transfer the data over. The channel or multiplex selection may be performed in accordance with one or more channel/multiplex selection rules each of which defines an event/condition and a corresponding operation to be performed in response to detection of the event/condition. The channel or multiplex identifier corresponding to the selected channel or multiplex may further be transmitted to the end-user device over the fixed connection to enable decoding or demodulation of the DTTV broadcast signal.

Some requested data may transferred to the DTTV transmitter and some over the fixed connection to the end-user device, in which case the method may further comprise selecting which of the received data to transfer to each in accordance with data selection rules each of which defines an event/condition and a corresponding operation to be performed in response to detection of the event/condition.

The rules may define one or more URL(s) corresponding to predetermined website(s) data from which is to be transferred to the DTTV transmitter. Additionally, or alternatively, the rules define one or more data types or services that, if requested, have their received data transferred to the DTTV transmitter. For example, video and/or online gaming data may be selected for DTTV transmission. Additionally, or alternatively, the rules may define a parameter associated with the end-user's fixed connection and a condition for said parameter that, if detected, is effective to cause requested data, or certain types of requested data, to be transferred to the DTTV transmitter. The parameter may be the download speed of the fixed connection which, if below a certain threshold, causes other requested data to be transferred to the DTTV transmitter.

The end-user device identifier transferred to the DTTV transmitter may be an IP or other network address associated with the end-user device.

The above-mentioned database(s) may be updated in response to selection of a particular DTTV transmitter and/or channel or multiplex.

The method may further comprise maintaining or accessing a TV white space database storing current usage of channels or multiplexes for one or more DTTV transmitters and unlicensed DTTV spectrum, and updating said TV white space database in response to selection or usage of a DTTV transmitter and a channel or multiplex thereon.

The method may further comprise controlling a steerable antenna at the user-end by issuing a control signal and transferring it over the fixed connection. The control signal may be effective to cause adjustment of the steerable antenna to point it towards a different DTTV transmitter.

The method may further comprise issuing a control signal effective to cause scanning of the steerable antenna at the end-user device and receiving signal strength information from a plurality of in-range DTTV transmitters and selecting one such DTTV transmitter to direct the steerable to based on current data usage on the in-range transmitters.

The method may further comprise encoding the data received from the external data communications network into a DTTV signal suitable for transmission by a DTTV transmitter. The encoding may for example encode the data using the DVB-T standard.

Transfer of the requested data to the DTTV transmitter may be performed by routing data when received at the BRAS on the fixed downlink.

A second aspect provides a method of receiving broadband data at an end-user device, the method comprising: transmitting over a fixed connection a signal including a data request and information identifying, or from which can be identified, one or more DTTV broadcast transmitter(s) in range of the end-user device; receiving a DTTV broadcast signal from one or more of the transmitters; and identifying and extracting from the DTTV broadcast signal(s) data intended for the end-user device.

The identifying and extracting step may comprise identifying an IP or other network address associated with the end-user device in the DTTV broadcast signal(s) and extracting the data associated with said address.

The method may further comprise receiving over the fixed connection a DTTV channel or multiplex identifier, the identifying and extracting step comprising tuning to the associated DTTV channel or multiplex and extracting the data intended for the end-user device from said channel or multiplex.

The method may further comprise receiving part of the requested data over a downlink on the fixed connection and combining said data with that received in the DTTV broadcast signal(s).

The method may further comprise acquiring signal strength information from each of a plurality of in-range DTTV transmitters and transmitting over the fixed connection the respective information sets.

The method may further comprise identifying and extracting DTTV data for output to a DTTV set-top box.

The method may further comprise receiving an antenna control signal over the fixed connection, effective to cause adjustment of a steerable antenna to point to a different direction. The antenna control signal may be effective to cause scanning of the steerable antenna to acquire the signal strength information.

The end-user equipment may be associated with a fixed DTTV antenna and a steerable antenna, the antenna control signal being effective to cause adjustment of the steerable antenna only.

A third aspect provides a computer program comprising instructions that when executed by a computer apparatus control it to perform the method of any preceding method definition.

A fourth aspect provides a non-transitory computer-readable storage medium having stored thereon computer-readable code, which, when executed by computing apparatus, causes the computer apparatus to perform the method according to any preceding method definition.

A fifth aspect provides a system for controlling routing of broadband data to user devices, the system comprising: a receiver for receiving from an user device over a fixed connection a signal including data requests and information identifying, or from which can be identified, a digital terrestrial television (DTTV) transmitter detected by the end-user device; and a controller or processor for requesting and receiving the data identified in the data requests from an external data communications network, and for causing transfer of part or all of the received data to the detected DTTV transmitter with an identifier associated with the end-user device for onwards transmission in a DTTV broadcast signal.

A sixth aspect provides a user-end system for receiving broadband data, the user-end system comprising a processor or controller arranged to transmit over a fixed connection a signal including a data request and information identifying, or from which can be identified, one or more DTTV broadcast transmitter(s) in range of the end-user device, to receive a DTTV broadcast signal from one or more of the transmitters, and to identify and extracting from the DTTV broadcast signal(s) data intended for the end-user device.

Advantageous aspects of the systems will be evident from the description below and also from features defined in method steps of the accompanying dependent claims.

BRIEF DESCRIPTION OF THE DRAWINGS

Embodiments will now be described, by way of non-limiting example, with reference to the accompanying drawings, in which:

FIG. 3 is a block diagram of an overlay controller forming part of the FIG. 2 system.

FIG. 4 is a block diagram of an overlay receiver module forming part of the FIG. 2 system.

DETAILED DESCRIPTION

Embodiments herein provide systems and methods for sending broadband data to end-users over a DTTV broadcast transmission. Systems and methods for receiving such data are also described. The term "broadband" in this context means packetized data that is transported using TCP/IP although the principle can in theory be applied to any form of packetized data communications.

Embodiments provide a wireless overlay system by which a fixed-line, or alternatively a fixed-wireless, connection is used for the uplink and for some or none of the downlink in certain situations with the DTTV downlink being used in preference or as an alternative, e.g. for low priority data. The fixed-line connection is a DSL connection but it can be a cable connection or any other connection which transports data over a physical medium.

This offers numerous technical advantages, including increased capacity and download speeds given the additional bandwidth offered by the DTTV spectrum. End users will usually be within range of multiple DTTV transmitters which offers extra capacity and flexibility notwithstanding that many end users may be using the system. The choice as to which in-range DTTV transmitter to use may be decided dynamically, for example using different antennae or a steerable antenna at the user premises. Further advantages will become evident.

Figure 1:
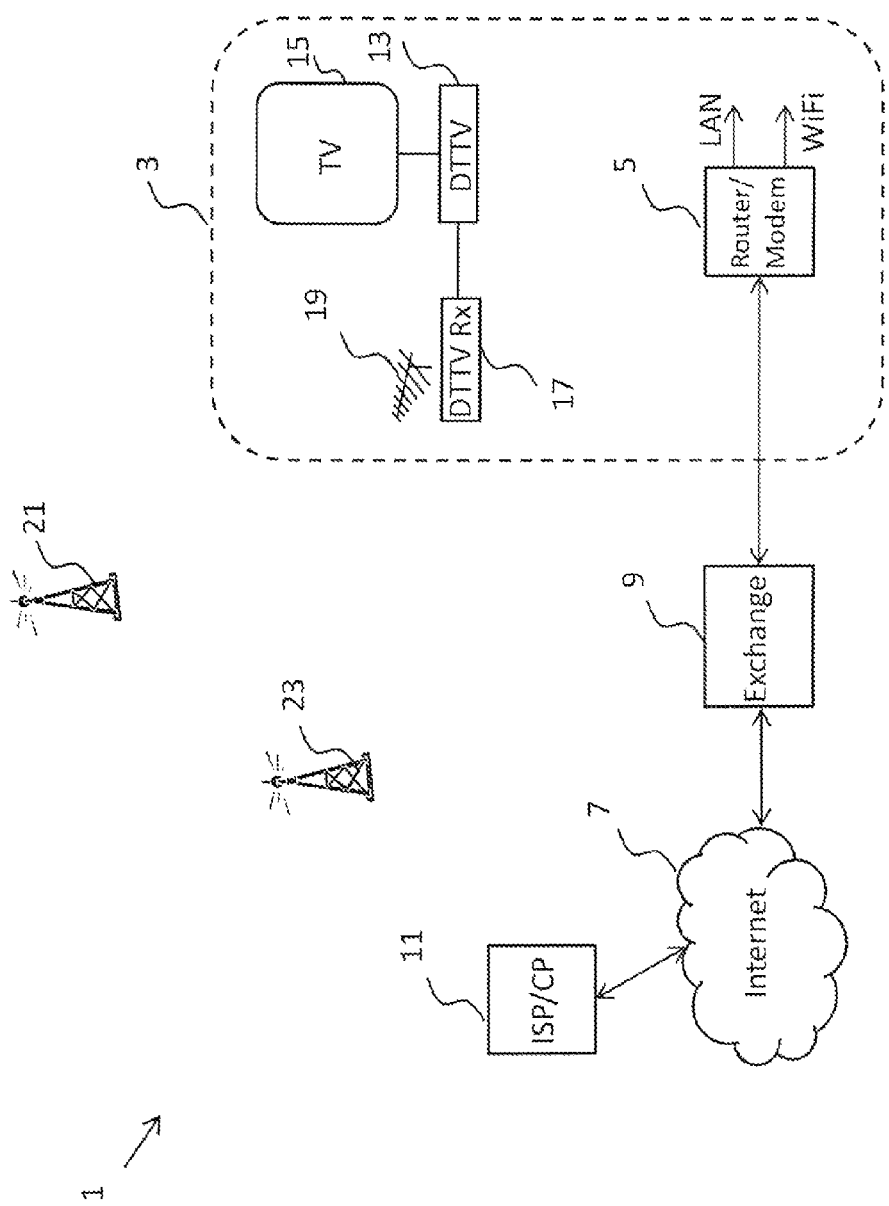
FIG. 1 is a block diagram of a conventional system for transmitting and receiving broadband and DTTV services.

Referring to FIG. 1, a conventional DSL and DTTV arrangement 1 is shown which is useful for background. At the user premises 3 is a router/modem 5 connected to a computer (not shown) by a wired or wireless connection, e.g. using Ethernet, IEEE 802.11 (WiFi) or a related technology. A DSL connection connects the router/modem 5 to a local telephone exchange 9 or similar network node which aggregates data from multiple users for connection to the Internet 7. In practice, there may be additional nodes within the chain between the router/modem 5 and the Internet 7. A Virtual Local Area Network (VLAN) is set-up between each node to provide for bidirectional data transfer in the conventional way.

An Internet Service Provider or Communications Provider (ISP/CP) 11 is also connected to the Internet 7 for controlling and managing equipment within the exchange 9 to provide a DSL service to its customers.

For television services, the end-user typically has a DTTV set-top box or tuner 13 connected to a television set 15. A DTTV receiver 17 receives TV broadcast signals through an antenna 19 connected to the tuner 13.

It will be appreciated therefore that the broadband and DTTV systems are entirely separate and independent of one another.

End-users will usually be in receiving range of at least one, and likely multiple DTTV transmitters 21, 23 which wirelessly broadcast DTTV signals. The antenna 19 will usually be directed towards one of the DTTV transmitters 21, 23 offering the strongest signal.

In Europe, the DTTV standard employed is Digital Video Broadcast (Terrestrial) (DVB-T) although embodiments herein can be used with any DTTV standard. In overview, DVB-T encodes video/audio data using MPEG2 or a similar encoding scheme for individual program streams and then into a combined program stream which is divided and transmitted on one of a number of multiplexes for transmission. The DVB-T standard also provides for encapsulation of packetized data, e.g. IP data, enabling broadband data to be broadcast from the DTTV transmitters 21, 23.

Figure 2:
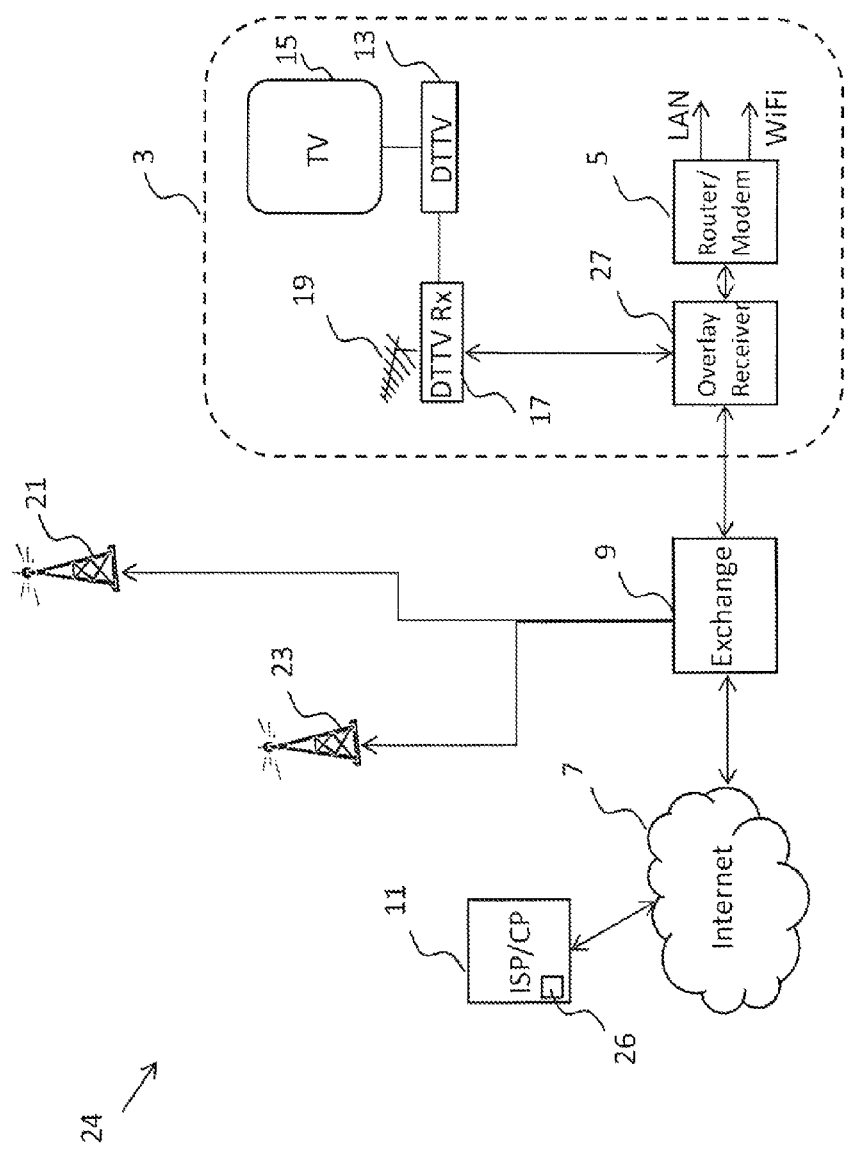
FIG. 2 is a block diagram of a system for transmitting and receiving broadband and DTTV services in accordance with a first embodiment.

Referring now to FIG. 2, a first embodiment system 24 is shown which provides a wireless downlink overlaying the traditional fixed-line connection. This system 24 differs from that shown in FIG. 1 in that the broadband and DTTV systems are linked to provide an alternative or additional downlink channel using DTTV transmission. Remote from the user premises 3, broadband data requested by the user over the DSL uplink is partly or completely transmitted under the control or instruction of the ISP/CP 11 using one of the DTTV transmitters 21, 23.

In overview, a user requesting, say, a data stream transmits the relevant TCP/IP request on the DSL uplink to the Internet 7 via the exchange 9. Also transmitted on the DSL uplink is data identifying an in-range DTTV transmitter, for example the first transmitter 21. The ISP/CP 11 may determine that some, or all of the requested data stream is to be transmitted using the DTTV transmitter 21 instead of, or in addition to, the DSL downlink. If so, the ISP/CP 11 selects the DTTV transmitter 21 and identifies or negotiates an available multiplex on which to broadcast the data stream. The ISP/CP 11 then informs the user over the DSL downlink of the multiplex to enable decoding at the user-end.

In the shown embodiment, the ISP/CP 11 instructs routing to the DTTV transmitters 21, 23 via the exchange 9 which is shown connected to each. This routing can be performed at an alternative node in the network if desired.

The ISP/CP 11 can also access and/or maintain a database of available DTTV multiplexes for the DTTV transmitters 21, 23 for use in the selection or negotiation of a multiplex. When use is made of a particular multiplex, the database is dynamically updated.

Referring to FIG. 3, the main functional modules of an overlay control system 26 at the ISP/CP 11 include a controller 30, a channel negotiation module 32, a routing negotiation module 33, a TV database 34, and a rule database 36. The overlay control system 26 may also be connected to an external TV white space database (TVWS DB) (not shown). The controller 30 is connected to each of the other modules 32, 33, 34, 36 and is arranged to control operation thereof under program control.

The channel negotiation module 32 is configured to perform functions, which include:

1) transmitter selection;
2) multiplex selection, if more than one multiplex is available for the selected transmitter; and
3) updating of the TV database 34 to indicate for the selected transmitter use of a multiplex and its subsequent release.

The routing negotiation module 33 determines which broadband data is to be transmitted over the DTTV downlink and which is to be transmitted over the DSL downlink. In some embodiments, all or substantially all broadband data may be transmitted over the DTTV downlink. In other embodiments, some broadband data may be transmitted over the DTTV downlink and other data transmitted downstream by DSL.

The rule database 36 stores rules inter-alia for the above channel and routing negotiation modules 32, 33. Rules define events/conditions and operations performed in response to detection of events/conditions.

The channel negotiation module 32, for example, may perform multiplex selection on the basis of the number of program streams currently carried by a multiplex, or, put another way, the available space on each multiplex. The multiplex with the most free-space may be selected in preference to others.

The routing negotiation module 33, for example, may determine that broadband data for specific web sites (identified by their URL) is transmitted by DTTV broadcast, which may be particularly useful for heavily-used social networking traffic or video streaming web traffic. Additionally, or alternatively, the rules may determine that broadband data for specific data services (e.g. video streaming or interactive gaming) is transmitted by DTTV broadcast. Additionally, or alternatively, the rules may determine that broadband data having a particular speed requirement is transmitted by DTTV broadcast. Additionally, or alternatively, the rules may determine that the DTTV downlink is used where users' DSL downlink is limited in terms of speed, capacity or contention ratio. Where rules are dependent on such quantitative measures, a suitable threshold can be set which, if approached or crossed, causes broadband data to be sent by DTTV broadcast. The rules may also relate to DTTV multiplex capacity, user's geographical location, the user's specific service, time of day, or similar criteria.

Data not selected for a DTTV broadcast is sent over the DSL downlink in the conventional manner. In such a case, the routing negotiation module 33 also communicates with the user-end receiver to enable multiplexing of the two downstream channels to combine the broadband data.

The rules stored in the rule database 36 may be updated periodically. Channel and routing negotiation can be performed automatically and dynamically.

The TV database 34 is akin to a TV White Space (TVWS) database which traditionally maintains details of available, unlicensed spectrum in the DTTV bandwidth. In this case, the TV database 34 may store TVWS information as well as availability on licensed multiplexes which will be used to transmit the broadband data. The TV database 34 stores this information for each DTTV transmitter 21, 23 and can provide augmented information to publicly-available TVWS databases on the basis of current usage to provide a more accurate and up-to-date snapshot of available spectrum for particular transmitters.

Encapsulation of the packetized broadband data into the relevant DTTV multiplex may be performed under the control of the ISP/CP 11 locally, at the exchange 9, or at the relevant DTTV transmitter 21, 23.

Referring back to FIG. 2, the user premises equipment includes an overlay receiver module 27 between the DTTV receiver 17 and the router/modem 5. This module 27 provides the hardware and/or software to enable reception and routing of broadband signals from a DTTV transmitter 21, 23. The overlay receiver module 27 is here shown as a stand-alone module but in practice can be built into the DTTV receiver 17, the DTTV tuner 13, the television set 15 and/or the router/modem 5.

Referring to FIG. 4, the main functional modules in the overlay receiver module 27 are shown.

An overlay demultiplexing module 40 takes as input the DTTV broadcast signal received by the antenna 19. The broadcast signal is received by a transmitter identification module 44 and a demultiplexer 46.

The transmitter identification module 44 is configured to identify the DTTV transmitter 21 from which the signal is received and pass its identity signal (TxID) to a second, routing module 42. The demultiplexer 46 is configured to separate the encapsulated broadband signal from the DTTV signal using information received from the channel negotiation module 32 over the DSL downlink. This information indicates the transmitter 21 and multiplex. The DTTV signal is directed towards the DTTV receiver 17 or tuner 13. The encapsulated broadband signal is transferred to a further, extractor module 48.

The broadband signal received from the demultiplexer 46 may contain broadband data for many users. The extractor module 48 identifies those packets destined for the user by means of the user's IP or other network address in the packet header. The extracted broadband data is transferred from the extractor module 48 to the second, routing module 42.

The routing module 42 includes a router 50 configured to route data between the router/modem 5, the Internet 7 via the exchange 9, and the overlay demultiplexing module 40. More particularly, broadband signals on the DSL uplink and downlink are appropriately routed, including URL requests on the uplink and (any) downlink data not transmitted using DTTV. The router 50 also transfers the TxID signal from the transmitter identification module 44 to the overlay controller 26 of the ISP/CP 11 over the DSL uplink. The router 50 also transfers the DTTV transmitter and multiplex identifiers received over the DSL downlink from the ISP/CP 11 to the demultiplexer 46.

Figure 5:
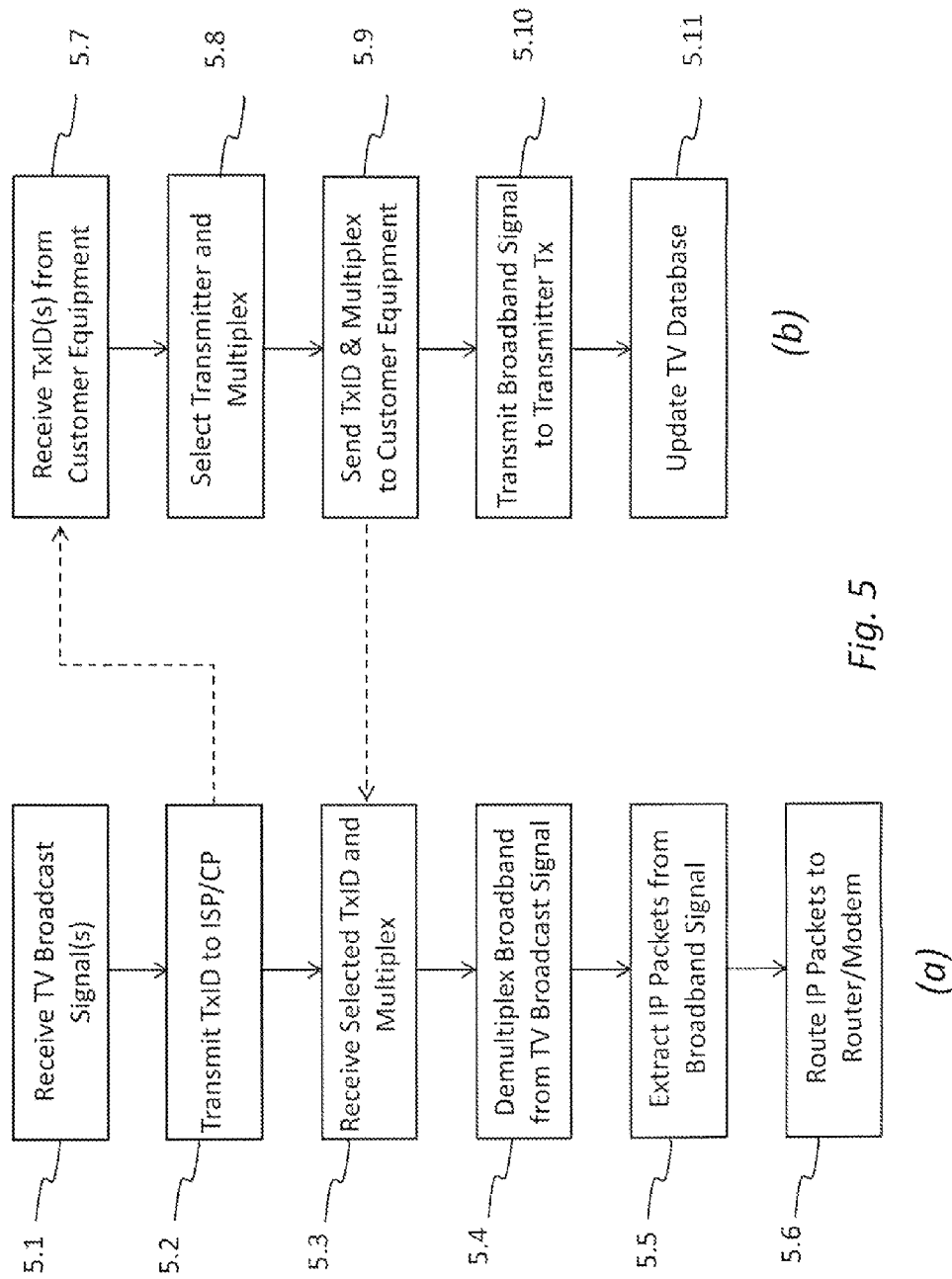
FIGS. 5(a) and 5(b) are flow diagrams showing processing activities performed by the overlay receiver module and overlay controller, respectively.

Referring to FIGS. 5(*a*) and 5(*b*), processing activities performed both at the overlay controller 26 (FIG. 5(*b*)) and the overlay receiver module 27 (FIG. 5(*a*)) are shown. The order of activities is merely indicative and it will be appreciated that certain steps can be interchanged or re-ordered. Reference numerals are not indicative of any particular order.

At 5.1, the overlay receiver module 27 receives a TV broadcast signal from a DTTV transmitter 21, 23. At 5.2, the TxID received in the TV broadcast signal is transmitted over the DSL connection to the overlay controller 26. At 5.3, the overlay receiver module 27 receives the DTTV transmitter and multiplex information from the overlay controller 26 indicative of the channel on which broadband data for the user will be transmitted. At 5.4, the TV broadcast signal is demultiplexed using the multiplex information to extract the broadband signal. At 5.5, the packetized data is extracted from the broadband signal using the user's IP address. At 5.6 the packetized data is routed to the router/modem 5.

At the ISP/CP overlay controller 26, at 5.7, the TxID is received from the overlay receiver module 27. At 5.8, a DTTV transmitter and multiplex is selected for use in broadcasting the broadband signals. At 5.9, the DTTV transmitter and multiplex identifiers are transmitted to the overlay receiver module 27. At 5.10, the broadband signals destined for the user are sent to the selected DTTV transmitter 21 for encapsulation (unless already encapsulated) and then broadcast. At 5.10, the TV database 34 is updated for the selected transmitter 21 to indicate current use of the selected multiplex.

Figure 6:
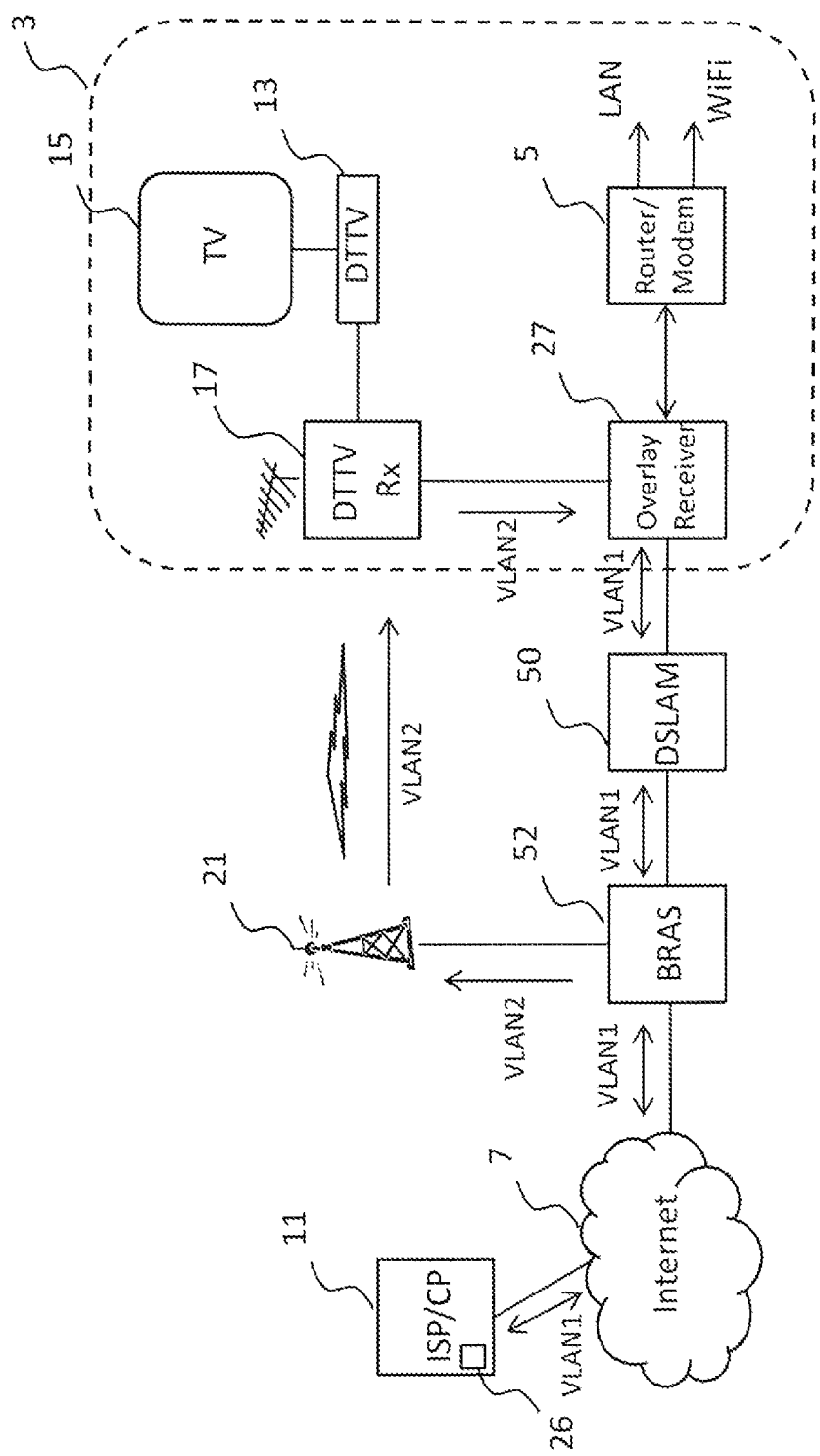
FIG. 6 is a block diagram of a system for transmitting and receiving broadband and DTTV services in accordance with a further embodiment.

FIG. 6 is a block diagram of a further embodiment which is similar to the FIG. 2 embodiment but in this case shows an implementation on a Next Generation Network (NGN) such as that provided by British Telecommunications plc in the United Kingdom. In place of the exchange 9 are a Digital Subscriber Line Access Multiplexer (DSLAM) 50 and a Broadband Remote Access Server (BRAS) 52 both of which are well-known in the art. Both the DSLAM 50 and BRAS 52 may be co-located, e.g. in a telephone exchange, or can be located at separate locations. A DSL uplink and downlink is set up in the conventional manner as indicated by the VLANs (VLAN1) between individual nodes.

In this embodiment, the overlay controller 26 communicates with the BRAS 52 to perform the above-described steps. The BRAS 52 sets up the new downlink (VLAN2) between itself and the overlay receiver module 27.

In some embodiments, two or more DTTV transmitters 21, 23 in-range of the DTTV receiver 17 may be detected at said DTTV receiver 17. This may be the case if the antenna 19 is an antenna array or if two or more antennae are present. In this case, a TxID for each is transmitted on the DSL uplink and the overlay controller 26 is operable to select one (or more) of the identified DTTV transmitters 21, 23 for the DTTV downlink. This selection is performed by the channel negotiation module 32 in association with rules in the rule database 36. The signal strength or a QoS parameter associated with each DTTV transmitter 21, 23 may be sent with the respective TxID which may be used to determine the selection. The DTTV transmitter 21, 23 providing the greatest received signal strength may be that which is selected, for example.

In a further embodiment, not shown, two antennae may be provided at the user end. One antenna may be directed towards a first DTTV transmitter 21 for the receiving of broadband over a DTTV downlink with the other antenna directed towards a second DTTV transmitter 23 for the receiving of DTTV television signals. This obviates the need for the demultiplexer 46 in module 40.

In a further embodiment, which is to be considered an optional enhancement to the FIGS. 2 and 6 embodiments, a steerable antenna is provided at the user end and an antenna controller at the overlay controller 26. The steerable antenna can be any antenna whose major lobe is changeable either electrically or mechanically to receive signals from a different direction.

In some embodiments, a single steerable antenna is provided. In some embodiments, two antennas are provided, one fixed and one steerable. In some embodiments, two or more steerable antennas are provided.

The steerable antenna is adjusted in response to an antenna control signal transmitted from the overlay controller 26. The antenna control signal is typically sent on the DSL downlink and routed by router 50 to control circuitry of the steerable antenna.

The overlay controller 26 may cause adjustment of the steerable antenna to:
  direct it towards a different DTTV transmitter offering greater signal strength or QoS;
  perform load balancing between the different DTTV transmitters based on information present in the TV database 34 or an external TVWS database; and/or
  initiate or control the steerable antenna to scan for DTTV transmitters.

When a change of DTTV transmitter is effected, a new multiplex may be required for the DTTV transmission which is performed by the channel negotiation module 32 in the described manner. When the steerable antenna is in the desired position, this is confirmed by the new TxID sent on the DSL uplink back to the overlay controller 26. Use of a new multiplex is indicated on the DSL downlink.

The steerable antenna may itself perform a scan to identify in-range DTTV transmitters 21, 23 and to send to the overlay controller 26 their respective signal strengths for use in transmitter selection.

As well as offering an additional wireless overlay to improve performance, the use and control of steerable antennas helps avoid transmitter overload and may also create more TV white space. This is because re-pointing receiver antennas can reduce the number of DTTV transmitters used for broadband in a given geographical area. This may be useful if independent TVWS devices move to a new location, in which case DTTV antennae in that location's area can be re-pointed so that TVWS is made available dynamically.

Figure 7:
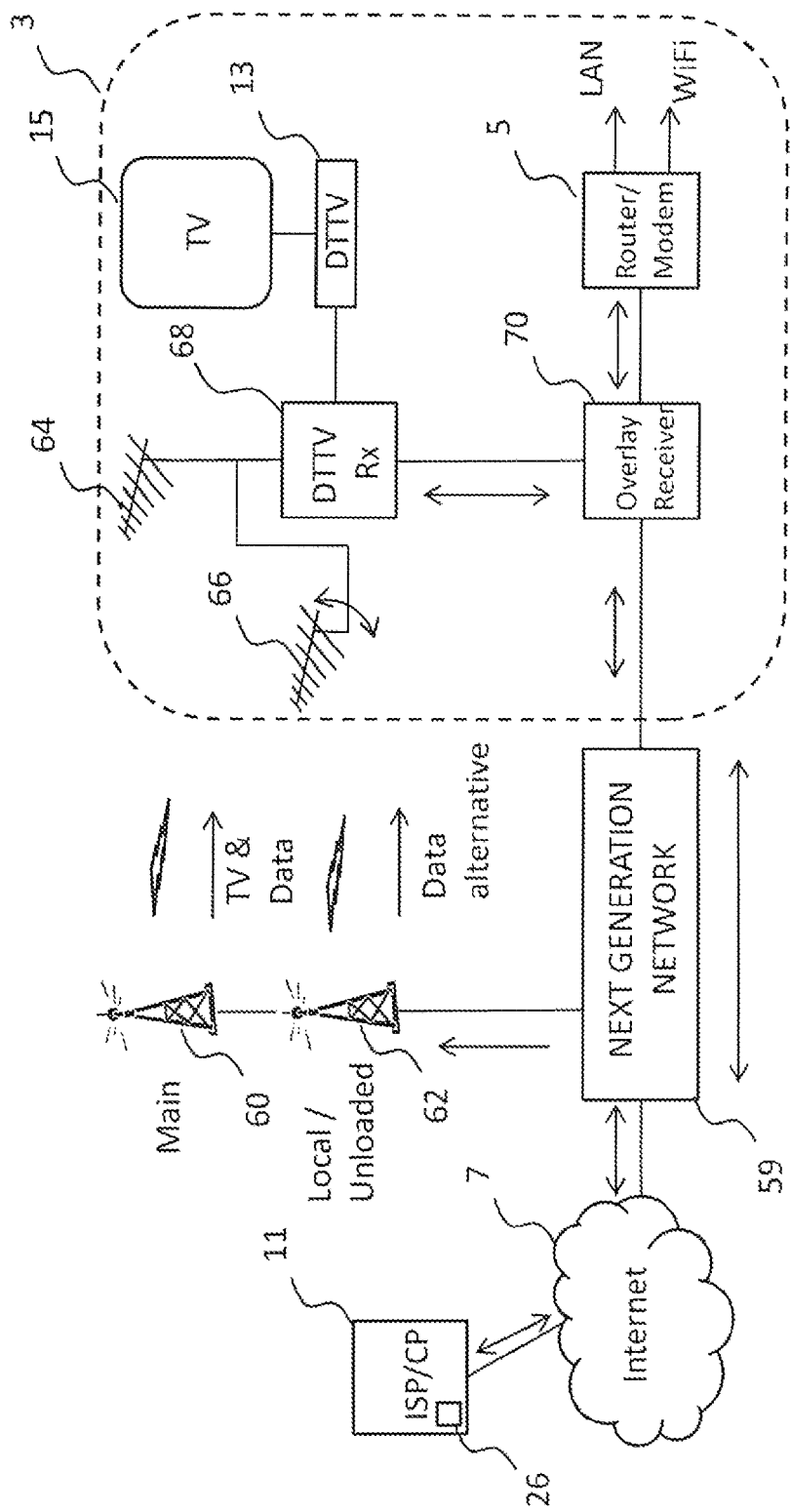
FIG. 7 is a block diagram of a system for transmitting and receiving broadband and DTTV services in accordance with a yet further embodiment.

FIG. 7 shows a further embodiment in which one fixed antenna 64 and one steerable antenna 66 is provided. The fixed antenna 64 may be directed towards a main DTTV transmitter 60 providing television signals and broadband data and the steerable antenna may be used solely for broadband data from a different DTTV transmitter 62, for example for when the main one is loaded. In the FIG. 7 embodiment, the overlay module 70 and DTTV receiver 68 are the same as those of other embodiments but also route antenna control signals to the steerable antenna 66.

In the case where two or more steerable antennae are provided, then the overall system can be optimized, e.g. in terms of maximum broadband capacity, best television reception and maximum TVWS availability.

In summary, systems and method are described for providing a wireless overlay downlink using DTTV technology and for controlling data routing. The advantages offered may include, but are not limited to:
  increased capacity and download speeds given the additional bandwidth offered by the DTTV spectrum;
  selection of alternative downlinks by means of selecting alternative DTTV transmitters, which can be performed dynamically and automatically;
  more efficient and effective use of TV white space;
  the use of existing DTTV infrastructure; and
  the use of an existing antenna at the user end, minimizing customer outlay.

Additional Implementation Details

The systems and methods of the above embodiments may be implemented in a computer system (in particular in computer hardware or in computer software or a combination of both) in addition or as an alternative to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Alternatively, a microprocessor, plural microprocessors, microcontroller, plural microcontrollers, ASIC and/or FPGA may be employed. The computer system may have a monitor to provide a visual output display. The data storage may comprise RAM, hard disk drive (HDD) or other computer readable media, including portable media and optical media. The computer system may include a plurality of computing devices connected by a network and able to communicate with each other over that network.

The methods of the above embodiments may be provided as computer programs or as computer program products or computer-readable media carrying a computer program which is arranged, when run/executed on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method of providing broadband data to end-user devices, the method comprising:
   receiving, from an end-user device over a fixed connection, a signal including data requests and information identifying a digital terrestrial television (DTTV) transmitter detected by the end-user device;
   requesting and receiving the data identified in the data requests from an external data communications network; and
   causing transfer of part or all of the received data to the detected DTTV transmitter with an identifier associated with the end-user device for onwards transmission in a DTTV broadcast signal.

2. A method according to claim 1, wherein the signal from the end-user device identifies a plurality of DTTV transmitters detected by the end-user device and wherein the method further comprises selecting one of said DTTV transmitters to which to transfer the received data.

3. A method according to claim 2, wherein the DTTV transmitter selection is performed in accordance with one or more transmitter selection rules each of which defines an event/condition and a corresponding operation to be performed in response to detection of the event/condition.

4. A method according to claim 3, wherein the method further comprises receiving signal strength information corresponding to each DTTV transmitter from the end-user device over the fixed connection and wherein the transmitter selection rules define that the DTTV transmitter offering the greatest signal strength is selected.

5. A method according to claim 1, wherein the method further comprises accessing a database storing for each DTTV transmitter channel or multiplex usage information and selecting from the available channels or multiplexes of the DTTV transmitter that which will be used to transfer the data over.

6. A method according to claim 5, wherein the channel or multiplex selection is performed in accordance with one or more channel/multiplex selection rules each of which defines an event/condition and a corresponding operation to be performed in response to detection of the event/condition.

7. A method according to claim 5, wherein a channel or multiplex identifier corresponding to the selected channel or multiplex is further transmitted to the end-user device over the fixed connection to enable decoding or demodulation of the DTTV broadcast signal.

8. A method according to claim 1, wherein some requested data is transferred to the DTTV transmitter and some over the fixed connection to the end-user device, the method further comprising selecting which of the received data to transfer to each in accordance with data selection rules each of which defines an event/condition and a corresponding operation to be performed in response to detection of the event/condition.

9. A method according to claim 1, further comprising maintaining or accessing a TV white space database storing current usage of channels or multiplexes for one or more DTTV transmitters and unlicensed DTTV spectrum, and updating said TV white space database in response to selection or usage of a DTTV transmitter and a channel or multiplex thereon.

10. A method according to claim 1, further comprising controlling a steerable antenna at the user-end by issuing a control signal and transferring it over the fixed connection.

11. A method of receiving broadband data at an end-user device, the method comprising:
    transmitting over a fixed connection a signal including a data request and information identifying one or more DTTV broadcast transmitter(s) in range of the end-user device;
    receiving a DTTV broadcast signal from one or more of the transmitters; and
    identifying and extracting from the DTTV broadcast signal(s) data intended for the end-user device.

12. A method according to claim 11, wherein the identifying and extracting comprises identifying an IP or other network address associated with the end-user device in the DTTV broadcast signal(s) and extracting the data associated with said address.

13. A method according to claim 11, further comprising receiving over the fixed connection a DTTV channel or multiplex identifier, the identifying and extracting comprising tuning to the associated DTTV channel or multiplex and extracting the data intended for the end-user device from said channel or multiplex.

14. A method according to claim 11, further comprising receiving an antenna control signal over the fixed connection, effective to cause adjustment of a steerable antenna to point to a different direction.

15. A non-transitory computer program comprising instructions that when executed by a computer apparatus control the computer apparatus to perform the method of claim 1.

* * * * *